No. 791,180. PATENTED MAY 30, 1905.
E. CANTONO.
ELECTRIC MOTOR FOR AUTOMOBILE VEHICLES.
APPLICATION FILED AUG. 11, 1902.

5 SHEETS—SHEET 1.

Witnesses:
O. W. Edelin
J. Lavergne

Inventor:
Eugenio Cantono
By Charles S. Jones
His Attorney

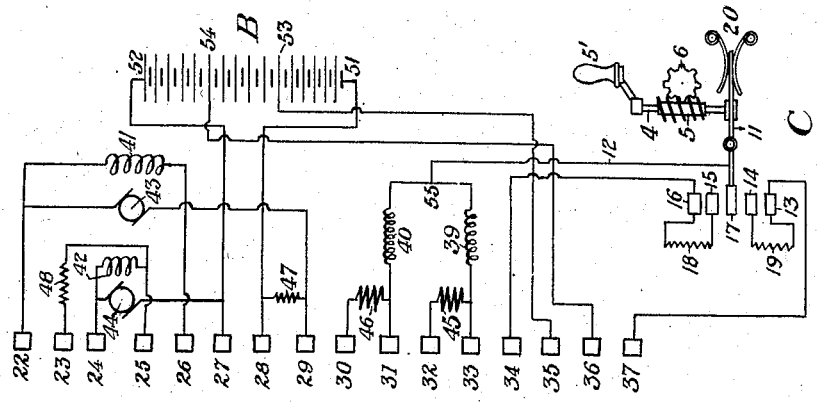

No. 791,180. PATENTED MAY 30, 1905.
E. CANTONO.
ELECTRIC MOTOR FOR AUTOMOBILE VEHICLES.
APPLICATION FILED AUG. 11, 1902.

5 SHEETS—SHEET 3.

Witnesses:
Grace L. Heasley.
Alexander S. Rodman

Inventor:
Eugenio Cantono
By Charles J. Jones
His Attorney

No. 791,180. PATENTED MAY 30, 1905.
E. CANTONO.
ELECTRIC MOTOR FOR AUTOMOBILE VEHICLES.
APPLICATION FILED AUG. 11, 1902.
5 SHEETS—SHEET 4.
Fig. 14,
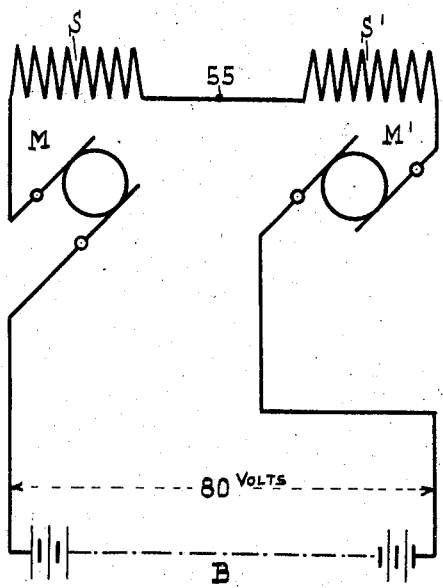
Fig. 15,
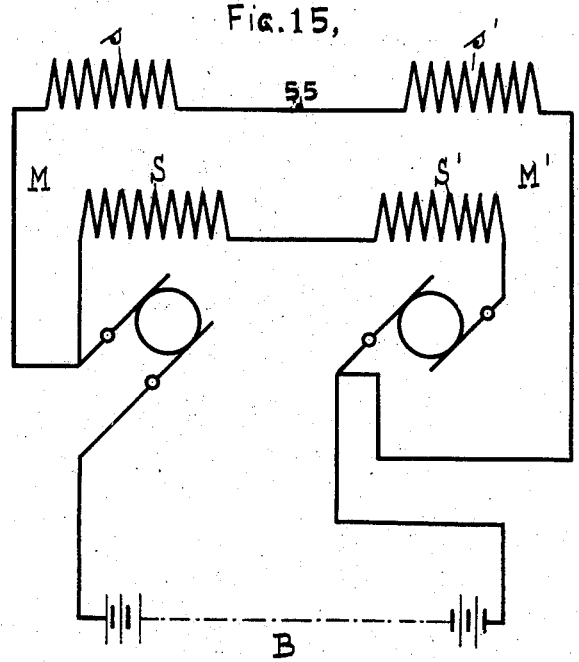
Witnesses:
Inventor:

No. 791,180. PATENTED MAY 30, 1905.
E. CANTONO.
ELECTRIC MOTOR FOR AUTOMOBILE VEHICLES.
APPLICATION FILED AUG. 11, 1902.

5 SHEETS—SHEET 5.

Witnesses:
O. W. Edelin.
J. Lavergne.

Inventor:
Eugenio Cantono
By Charles S. Jones
His Attorney

No. 791,180.      Patented May 30, 1905.

UNITED STATES PATENT OFFICE.

EUGENIO CANTONO, OF ROME, ITALY, ASSIGNOR TO GIOVANNI MAZZACORATI, OF NEW YORK, N. Y.

ELECTRIC MOTOR FOR AUTOMOBILE VEHICLES.

SPECIFICATION forming part of Letters Patent No. 791,180, dated May 30, 1905.

Application filed August 11, 1902. Serial No. 119,273.

*To all whom it may concern:*

Be it known that I, EUGENIO CANTONO, captain of engineers in the Italian army, a subject of the King of Italy, and a resident of Rome, Italy, have invented certain new and useful Improvements in and in the Application of Electric Motors for Automobile Vehicles, (for which I have applied for Letters Patent in Italy July 2, 1902; in France May 5, 1902; in Germany July 12, 1902, and in Belgium July 11, 1902,) of which the following is a specification.

The present invention relates to the driving and steering mechanism of electric self-propelled vehicles, and is designed as an improvement upon the invention covered by my Patent No. 692,236, dated February 4, 1902.

The invention will be understood by reference to the accompanying drawings, in which—

Figure 1:
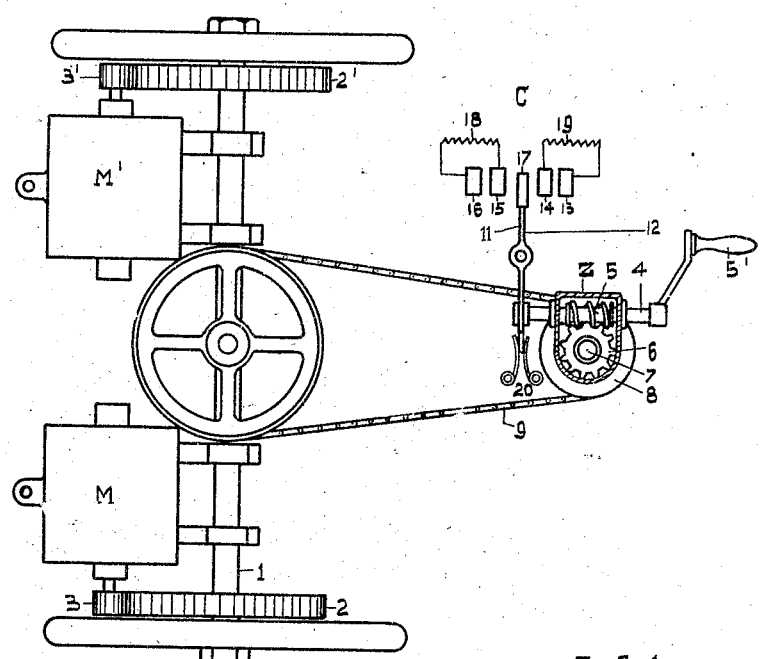
Figure 2:
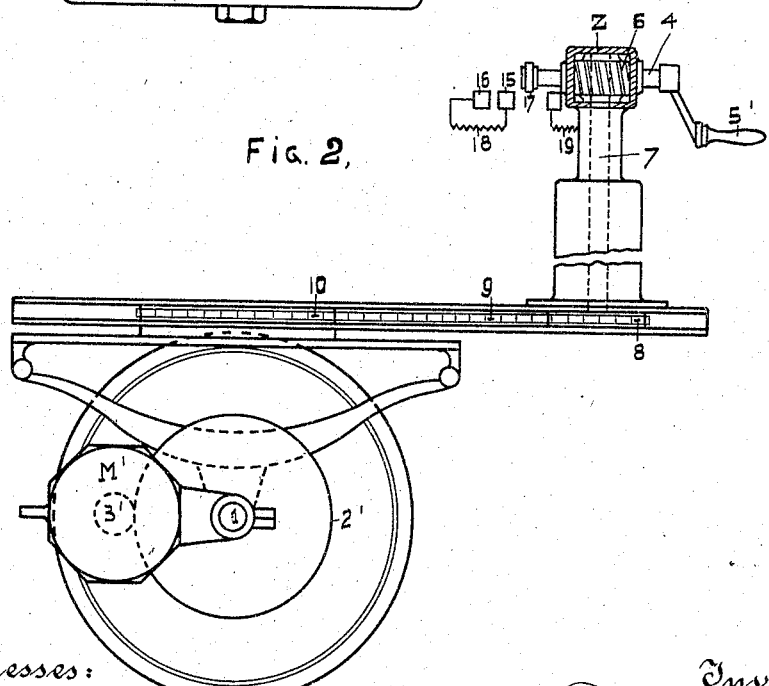
Figure 5:
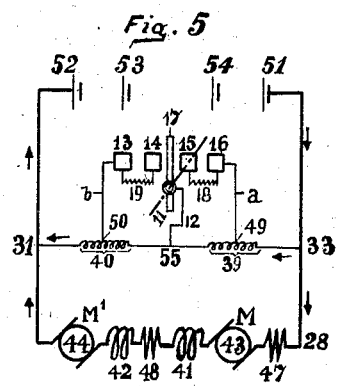
Figure 6:
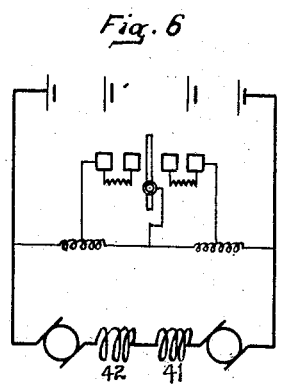

Figure 1 is a top view, and Fig. 2 a side view, of a portion of the machine. Fig. 3 is a diagrammatic view in which the controller-drum is developed and permanent connections of the motor and resistance circuits conventionally shown. Fig. 4 is another arrangement of these permanent connections in the upper part of the controller. Figs. 5, 6, 7, 8, 9, 10, 11, 12, and 13 are diagrammatic views of the successive changes made in the circuit connections by the progressive rotation of the controller-drum. Figs. 14 and 15 are diagrammatic views to illustrate the principle of the invention, and Figs. 16, 17, 18, 19, 20, 21, 22, 23, and 24 are diagrammatic views to illustrate certain modifications.

Similar reference numerals and letters indicate similar parts in the several views.

The underlying principle of the present invention is that by the combination of two similar electric motors series wound and whose excitation-coils are in series and supplied with the same current I am enabled to simultaneously alter the value or intensity of the excitation of each motor, and therefore the relative speed of the two motors, so that while the speed of one motor is increased that of the other will be diminished. This is accomplished by changing the potential of the junction-point of the two series coils, and before describing my invention in detail brief reference will be made to the diagrammatic views, Figs. 14 and 15, for a statement of the principle of the invention.

Referring to Fig. 14, M and M' designate two similar motors, S and S' the series coils, 55 the point of union of the two field-coils, and B the storage battery. Assuming the difference of potential between the extremities of the field-coils to be eighty volts, then the point 55 has a potential of forty volts. Each motor therefore will run under a difference of potential of forty volts and their speed will be the same. If now we bring the point 55 to sixty volts, then the left-hand motor will run under a difference of potential of sixty volts and the right-hand motor under twenty volts. The motors will thus have a different speed, but the total number of revolutions will be equal to the number of revolutions when each motor was running under forty volts. The same effect will result from using two shunt-wound motors whose shunt-coils are in series with each other.

Fig. 15 illustrates the principle of my invention as applied to compound-wound motors, in which M and M' are the motors, s and s' the two shunt-coils, and S and S' the series coils, and B the battery. The latter coils are in series with each other, but they can be set in parallel; but the two shunt-coils are always in series. Therefore each shunt-coil requires only one-half of the total potential of the battery and the point 55 of the union of the two coils can have a variable potential between the limits of the battery, and I am therefore enabled to vary the relative speed of the two motors in whatever way the series coils may be connected. Of course the two series coils of a compound-wound motor can be arranged always in series and the shunt-coils then connected in series or parallel.

Having explained the fundamental principle of my invention, I will now describe its practical application to the driving and steering mechanism of a self-propelled electric vehicle. Since compound-wound motors embody all the features of motors otherwise wound in the application of my invention to electric self-propelled vehicles, I have selected that type of motor for purposes of illustration.

Referring to Figs. 1 and 2, the numeral 1 designates the front axle of the vehicle, on which are secured two spur-gears 2 and 2', meshing, respectively, with smaller driving-gears 3 and 3', the latter being secured upon the shafts of the motors M and M', respectively. The said motors are mechanically independent of each other.

Z designates a suitable box or casing, and mounted loosely in bearings therein, so as to have a longitudinal movement, is a shaft 4, adapted to be rotated by means of a handle 5'. Keyed to the shaft 4 is a worm 5, meshing with a wheel 6, fixed to a vertical shaft 7, having bearings in the box Z. To said shaft is also fixed a sprocket-wheel 8, around which passes a chain 9, by which motion is transmitted to a steering-wheel 10, fixed on the front axle 1.

C designates a switch of any suitable character controlled by the movement of the shaft 4 to vary the intensity of excitation of the shunt-coils in the manner before described. This variation may be utilized alone to effect the steering of the vehicle or in combination with the mechanical means above described, in which case the manual effort to steer exerted by the operator is reduced to a minimum in light vehicles and greatly facilitated with heavy vehicles. In the present example of my invention I have shown the shaft 4 as in operative connection with an arm 11, whose end 17 can be moved from its neutral position, (shown in Fig. 1,) so as to be brought into contact with the plates 13 14 15 16 by the movement of the steering-handle 5'. A wire 12 connects the arm 11 with the junction-point 55 of the two shunt-coils 39 and 40 of the motors, Figs. 3 and 4. 18 and 19 designate resistances connecting, respectively, plates 15 16 and 13 14. The two springs 20 are situated one on each side of the arm 11 to restore it to its normal position.

In Fig. 3 the numerals 22 to 37, inclusive, designate the controller-terminals. 39 and 40 are the two shunt-coils, 41 and 42 the series coils, and 43 and 44 the armatures of the two compound motors. 45 and 46 are the two resistances in series with the shunt-coils of the motors, 47 and 48 two resistances that can be put in series with the series coils of the motors. B is the storage battery.

Terminals 34 and 37 are directly connected to the plates 16 and 13 of the steering device C, while terminals 35 and 36 are in connection with the points 50 and 49, respectively. These two points are taken about at the middle of each shunt-coil. Assuming now that the controller-drum is moved so that the column of the first forward speed is under the controller-brushes and the shaft 4 and arm 11 in the position shown in Fig. 1, so that the point of connection 55 of the two shunt-coils 39 and 40 is in connection with said arm 11 only, then the path of the current through the different plates and bars of the controller will be that shown diagrammatically in Fig. 5. It will be seen from Fig. 5 that the intensity of the current is the same in each shunt-coil of the two motors and that the amount of excitation and speed of the two motors is the same. The vehicle will therefore travel forward in a straight line.

If now it is desired to turn to the right, the speed of the left-hand motor must be increased. This is accomplished as follows: The steering-handle 5' is turned right-handed, the effect of which is to move the shaft 4 longitudinally in its bearings, and thereby to bring the arm 11 into contact with plate 15, as shown by the broken line in Fig. 5. Assuming that the same column of the controller-drum is under the brushes, it will be seen that the current starting from the positive pole of the battery 51 flows to the shunt-coil of motor M through point 33 to point 49, where it finds two circuits open—the first through the second part of the shunt-coil 49 to point 55, the second through plate 16, resistance 18, plate 15, arm 11, and point 55; from whence all the current flows through the shunt-coil of the motor M' to the negative pole of the battery 52. At the same time the principal part of the current will flow between points 33 and 31 through the armatures and series coils.

Two facts are evident from the last-described distribution of the current: First, since the total shunt resistance on the terminals of the battery is weakened more current will flow through the shunt-coils of the motors and the two motors will undergo a slight increase of excitation; second, in the right-hand motor the value of the excitation will be diminished, owing to the shunt of the current through resistance 18, and the amount of this decrease is of course greater than the increase due to the first fact. In other words, the excitation is greater in the left-hand motor than in the right-hand one. Since the armatures of the two motors are in series, the increase of the excitation in the left-hand motor and the decrease in that of the right-hand motor results in strengthening the torque in the left-hand motor and of weakening it in the right-hand motor. The left-hand wheel of the vehicle will therefore have a tendency to run ahead of the right-hand wheel, and the vehicle will turn in accordance with the operator's intention as long as the arm 11 is kept in contact with plate 15. After the turn has been partially made the pinion 6 reverses the motion of the worm and brings the worm to its initial position and allows the arm 11 to assume its original position, the action of the operator having been in beginning the turn to place the front axle at an angle to the vehicle-body.

If the difference between the speeds of the two motors produced by the contact 11 15 is not sufficient to effect the complete turning of the vehicle, the handle 5' is turned still farther in a right-handed direction in order to move the hand 11 into contact with plate 16. The effect of this will be a short-circuit between the points 49 and 55, leaving only the first half of the shunt-coil of the right-hand motor for excitation of said motor, and for the reasons above set forth the number of ampere-turns on the right-hand motor will be still further reduced and that of the left-hand motor increased, the relative speeds of the two motors being in proportion to this decrease and increase.

By judiciously selecting the position of the point 49 and the value of the resistance 18 a gradual and sufficient effort of the motors can be attained to render the change of direction easy in all practical cases. Of course if the steering-handle is turned in the left-handed direction the speed of the right-hand motor will be increased and that of the left-hand motor decreased in order that the vehicle may be steered to the left. In such case the arm 11 is moved into contact with the plates 14 and 13 successively.

If the column of the second forward speed of the controller-drum is brought under the controller-terminals, the connections between the controller-plates is the same as before, except that resistances 47 and 48 are cut off from the circuits of the series coil. In that case we have the second speed forward shown diagrammatically in Fig. 6.

Figure 7:
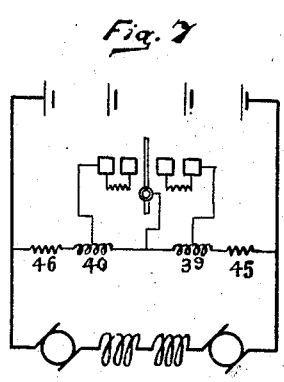
Figure 8:
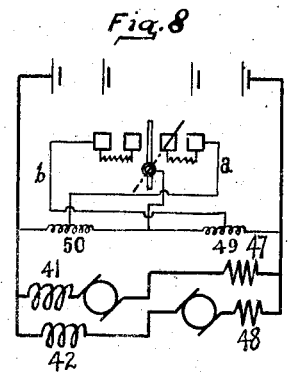

Column III, Fig. 3 and Fig. 7, gives the third speed forward. By tracing the circuits it will be seen that the two equal resistances 45 and 46 in the shunt-exciting circuits of the motors will produce a weakening of the magnetic field, and therefore an acceleration of speed.

When the column IV forward of the controller-drum is under the brushes, the terminal 36 instead of being connected as before with the terminal 37 is connected with the terminal 34, and terminal 35 is in communication with 37. Consequently the point 50 is connected with the plates 16 and 15 and the same movement of the controller-handle—that is, in a right-handed direction for steering to the right—will move the arm 11 into contact first with the plate 15 and then with the plate 16, the result of which will be a weakening of the excitation in the left-hand motor and a strengthening of that in the right-hand motor. Now in the controller position IV forward, which is the fourth speed, the two armatures are connected in parallel, as can be readily traced in Fig. 3, and is diagrammatically shown in Fig. 8. Under these conditions the motor in which the excitation is weakened—the left-hand motor—will move faster, and the right-hand motor, whose excitation is strengthened, will move slower, and consequently the vehicle will turn to the right.

Figure 9:
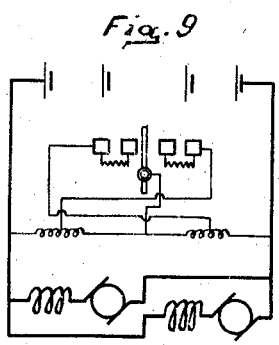
Figure 10:
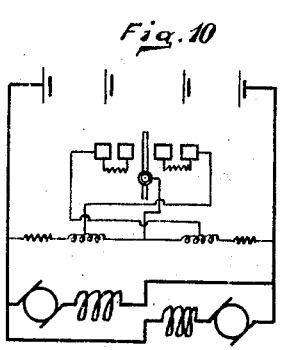

The fifth speed is attained by bringing column V, Fig. 3, under the controller-brushes, and it only differs from the preceding by the omission of the resistances 47 and 48 in the circuit of the series coils, as shown in Fig. 9.

The sixth speed forward (shown diagrammatically in Fig. 10) is obtained by the addition of the same accelerating resistances in the shunt-circuit as above referred to in connection with column III and Fig. 7. As will be seen in the forward motions, the practicability of the arrangement is perfect, because the mechanical movement imparted by the operator accords perfectly with the action of the motors at all speeds.

Figure 11:
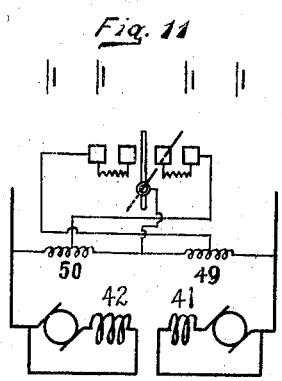

We will now consider what occurs with the auxiliary speeds—that is, the braking and backward motions. In the brake position, as shown in Fig. 3 and Fig. 11, the armature of each motor is short-circuited with the series coil, but the shunt-coils are in the same standing as in the other positions of the controller. The points 49 and 50 are in connection with the plates of the steering-switch, as in Fig. 8. Under those conditions the movements of the steering-handle 5' will result still in weakening the excitation of the motor, which is to move faster, and strengthening it in the other, and that will result in weakening the resisting torque, and with it the brake action in the wheel, which is to move faster and inversely in the other wheel—that is to say, to render the actions of the motors also in the braking position of the controller accord perfectly with the movement of the steering-handle.

Figure 12:
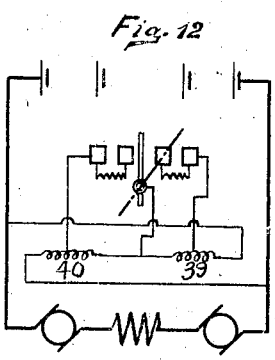
Figure 13:
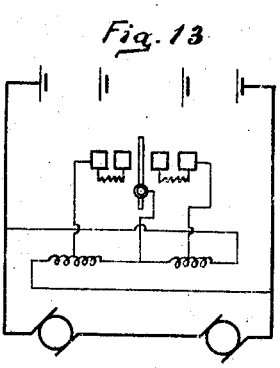
Figure 16:
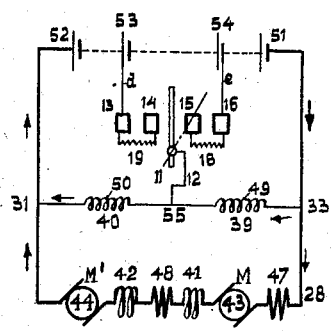
Figure 17:
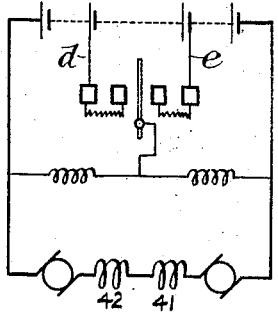
Figure 18:
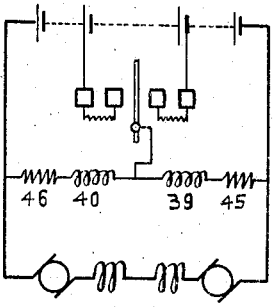
Figure 19:
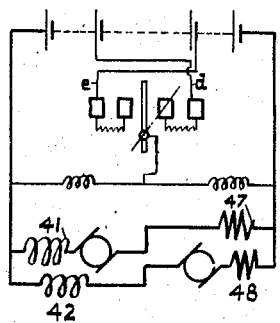
Figure 20:
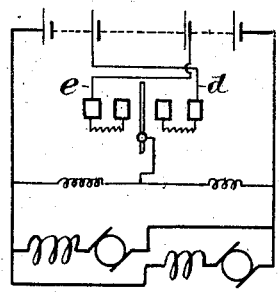
Figure 21:
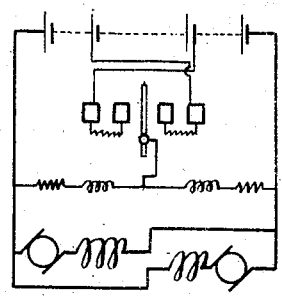
Figure 22:
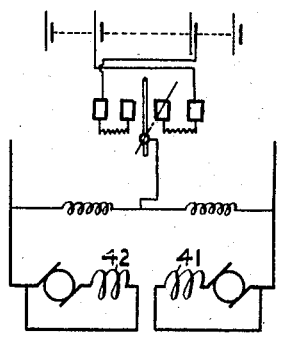
Figure 23:
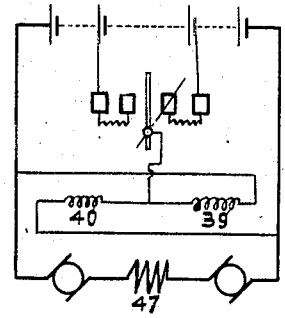
Figure 24:
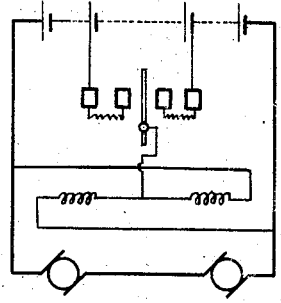

The two backward motions are effected by changing the direction of the current in the circuit of the shunt excitation and leaving out the series excitation, as shown diagrammatically in Figs. 12 and 13, the former being a diagrammatic view of the first backward speed, a resistance 47 being inserted between the two armatures, and the latter giving the second backward motion where the above resistance is cut off.

In order to steer the vehicle during the backward motion, the steering-handle is turned in a direction contrary to that above described with reference to turning when in the forward motion. This movement should, as in the forward motion, be aided by the effort of the motors. It will be obvious in order that there may be harmony between these two forces that for the same direction of rotation given the steering-handle the motor which is to move faster is not the same in the backward motion as that in the forward motion. Care must therefore be taken, as shown in the drawings, that in its successive positions the controller-brush 35 shall be connected with the plate 16 and the controller-brush 36 with the plate 13, as in Fig. 3, and diagrammatically, as in Figs. 12 and 13.

It will be seen that the controller provides the means for forming all the necessary combinations to render the action of the motors in perfect accord with the mechanical action exercised by the operator in braking, changing, and reversing the direction of motors.

With the two electric motors whose excitation-circuits are in series, as stated above, I am enabled to change the magnetic intensity of the field in either motor by means of the electric connections made by the axial displacement of the worm-gear and obtain the same results in steering the vehicle as before without short-circuiting a portion of the windings of the coils of the induction-circuits, as above set forth. This has the advantage of omitting the conductors which had to pass into each motor to reach the points 49 and 50. For this purpose the arrangement is as follows: The point 55, which divides into two equal parts the whole resistance of the two induction-circuits of the motors, will be normally at the medium potential of the battery. The potential of said point can be varied by connecting it with the terminals of the different cells of the battery, and then the intensity of the current traversing the induction-circuit of each motor will become proportional to the difference of potential existing at the terminals of the said circuits. In applying this simple system—that is, in connecting point 55 with the different cells of the battery—it is possible to regulate the excitation of the two motors in order to facilitate the steering. Fig. 4, with the diagrammatic views Figs. 16 to 24, illustrates this other means for carrying out my invention. Fig. 4 gives the permanent connections between the terminals of the controller, the battery, the motors, and the electric steering device C, while the controller-drum and the connections between its plates are the same, like in Fig. 3. Also for this purpose the connections $a$ and $b$ in Figs. 5 to 13 are removed and the connections $d$ and $e$ of Figs. 16 to 24 inserted. Point 55 is still connected with arm 11; but the terminals 35 and 36 are connected, respectively, with cells 53 and 54.

The method of operation of the arrangement illustrated in Fig. 4 is the same as that of Fig. 3, which has already been sufficiently described, except for the modifications rendered necessary by the changes hereinafter described. With respect to the differences caused by these modifications it will suffice to examine any one of the positions of the controller in order to be able to understand by the aid of Fig. 4 and Figs. 16 and 24 and the present explanations what takes place in all the other positions. Assuming, for example, that the column I forward is under the controller-terminals and that it is desired to turn the vehicle quickly to the right or to make the left-hand motor run faster, then the handle 5' is turned right-handed until the arm 11 comes in contact with the plate 15, which through terminals 34 and 35 is connected with cell 53. Consequently the point 55 is connected with cell 53 and will take its potential. The two cells 54 and 53 are so placed that they comprise the central third of the whole battery, and 53 is nearest to the positive pole of the battery. Then the difference of potential between the extremities of the shunt-coil 40 of the left-hand motor will be greater than between the extremities of the shunt-coil 39 of the right-hand motor, and therefore the value of the excitation and the speed in the left-hand motor will be greater than in the right-hand motor and the vehicle will turn to the right. By repeating these operations for the different positions indicated on the controller, as already explained, it will be found that in all the said positions the connections between the different points of the circuit are effected, so that there always results perfect harmony between the effort of the operator and the effort produced by the action of the motors when it relates to steering the vehicle.

Owing to the longitudinal play allowed to the worm 5, the latter can move slightly, so as to produce automatically the necessary commutations to bring back to the correct position the wheel, which under the action of a preponderating resistant force remains behind momentarily. The slight angular displacement allowed to the axle by the slight longitudinal play of the worm has consequently the result of easing the shocks to which the parts of the mechanical steering mechanism are subject. In fact, as soon as the axle leaves its position corresponding to the position of the worm determined by the central or neutral position 17 of the arm 11 on the center of the plates 14 and 15 of the switch C the worm driven by the parts which connect it to the axle moves in its turn and pushes the arm 11 onto the side plates of the switch C, and instantaneously the speed of the motor at the end of the axle which had remained behind increases and makes an effort which is always able to overcome the resistant force, so that the worm will very seldom be pushed so far as to strike against one of its supports. In other words, the stability of the control of the vehicle depends very seldom upon the mechanical resistance of the parts which form the mechanical steering device, and in any case never exclusively upon them. This feature, which is a very important one for the preservation of the vehicle, is therefore completely assured by the arrangements adopted and above described.

It will be seen that when operating according to my invention the speed of the vehicle is not decreased when effecting a turn—that is, the direction of the axle with respect to the vehicle while changed—the speed of the vehicle in turning is not varied from that before making the turn. Instead of employing only two motors, as shown in the drawings, I may use any multiple of two on each side, each set of two motors being connected to the axle through the same gearing.

The principle of my invention is applicable not only to the steering of self-propelled vehicles, but also to the steering-gear of vessels, with such modifications as would be required to accommodate the changed conditions.

What I claim, and desire to secure by Letters Patent, is—

1. A steering mechanism for electrically-propelled vehicles comprising a plurality of motors each connected independently with the axle of the vehicle, a switch having contact-plates, the arm of said switch being connected to the point of union of the field-coils of said motors, a controller included in the circuits of said coils, the plates of said switch being connected through the plates of said controller to points in the battery.

2. A steering mechanism for electrically-propelled vehicles comprising a plurality of motors whose excitation-coils are in series, and means to vary the potential at the point of union of the said coils by connecting said point with variable points between the terminals of the battery.

3. In an electrically-propelled vehicle the combination with the driving-axle, of a plurality of motors each connected independently with said axle, each motor having series field-coils either in series or in parallel and shunt-coils in series, and means to vary the potential at the point of union of said shunt-coils by connecting said point with variable points between the terminals of the battery.

4. A steering mechanism for electrically-propelled vehicles comprising a plurality of motors having shunt field-coils connected in series, a switch having contact-plates the switch-arm of which is connected to the point of union of said shunt-coils, a controller included in the circuits of said coils, the plates of said switch being connected through the plates of said controller to points in the battery.

5. A steering mechanism for electrically-propelled vehicles comprising a plurality of motors each connected independently with the axle of the vehicle, and having their excitation-coils in series, a switch included in the circuits of the fields of said motors, mechanical steering mechanism also connected to the vehicle-axle, and means controlled by said mechanical steering mechanism to operate said switch whereby the potential of the point of union of the excitation-coils can be varied by connecting said point with variable points between the battery-terminals before the mechanical steering mechanism becomes operative.

6. A steering mechanism for electrically-propelled vehicles comprising a plurality of motors each connected independently with the axle of the vehicle, each motor having series field-coils either in series or in parallel and shunt-coils in series, a switch included in the circuits of the fields of said motors, mechanical steering mechanisms also connected to the vehicle-axle, and means controlled by said mechanical steering mechanism to operate said switch whereby the potential of the point of union of said shunt-coils can be varied by connecting said point with variable points between the battery-terminals before the mechanical steering mechanism becomes operative.

In witness whereof I have hereunto set my signature in the presence of two witnesses.

EUGENIO CANTONO.

Witnesses:
   S. B. ZAMARDO,
   A. RAGG.